United States Patent
Asano et al.

(10) Patent No.: US 6,353,288 B1
(45) Date of Patent: Mar. 5, 2002

(54) PLASMA DISPLAY PANEL INCLUDING A COMPONENT PROVIDED BETWEEN FRONT AND BACK PLATES THEREOF

(75) Inventors: Takahiro Asano, Machida; Narito Shibaike, Setagaya-ku; Yoshio Watanabe, Yokohama; Tetsuya Kato, Sagamihara, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/407,997

(22) Filed: Sep. 29, 1999

(30) Foreign Application Priority Data

Sep. 29, 1998 (JP) .......................................... 10-274953
Oct. 8, 1998 (JP) .......................................... 10-286256

(51) Int. Cl.[7] ................................................ H01J 17/49
(52) U.S. Cl. ........................ 313/582; 313/586; 313/587
(58) Field of Search ................................. 313/581, 582, 313/583, 584, 585, 586, 587, 292; 445/25

(56) References Cited

U.S. PATENT DOCUMENTS

| 3,821,588 | A | * | 6/1974 | Przybylek | 313/528 |
| 4,582,210 | A | * | 4/1986 | Morimoto et al. | 313/567 |
| 5,675,212 | A | * | 10/1997 | Schmid et al. | 313/292 |
| 5,754,003 | A | * | 5/1998 | Murai et al. | 313/582 |
| 5,859,502 | A | * | 1/1999 | Spindt et al. | 313/495 |

* cited by examiner

Primary Examiner—Michael H. Day
Assistant Examiner—Joseph Williams
(74) Attorney, Agent, or Firm—Parkhurst & Wendel, L.L.P.

(57) ABSTRACT

The invention relates to a method of disassembling a plasma display panel ("PDP") for reutilization. A first method uses a component, which is thermally not contractible at a softening temperature of bonding material used for hermetically bonding a front and back plates, and positioned between the plates. The above component maintains or widens a space provided between the two plates when the PDP is heated, thereby facilitating disassembly of the PDP. The invention also provides a groove on a surface of either or both plates for communicating the bonding material to an exterior of the PDP. Softened bonding material can be drawn out or absorbed through the groove. Heating and cooling of the PDP may be made through a laminated graphite sheet placed on a surface of the PDP for uniformalizing thermal distribution. A second method separates a PDP into two plates by immersing the PDP in etching solution capable of selectively dissolving only lead glass, and melting the bonding material. A groove is provided between the perimeter of an image display screen and a bonded portion in order to prevent etching solution from permeating into the screen area. The groove is formed on the substrates in parallel with a longitudinal direction of electrodes. The separated plates are refurbished by restoring a deteriorated or defective portion into the original condition for use in manufacturing a new PDP.

8 Claims, 10 Drawing Sheets

PRIOR ART

PLASMA DISPLAY PANEL INCLUDING A COMPONENT PROVIDED BETWEEN FRONT AND BACK PLATES THEREOF

FIELD OF THE INVENTION

The present invention relates to recycling of a plasma display panel (hereinafter referred to as "PDP") employed in a computer terminal, a wall-hung television, and the like. More particularly, the invention relates to a method of disassembling a PDP, as well as a structure of a PDP and a method of heating the PDP, with which the disassembling is made efficiently.

BACKGROUND OF THE INVENTION

PDPs are self-luminous displays that are easily viewable from a wide range of angles, advantageously very thin and large in screen area size. For these reasons, PDPs are becoming ever more popular as new display devices that are replacing cathode ray tubes (CRTs). Since surface-discharge type AC PDPs, in particular, are easy to manufacture, and have a long operational life, many of them have been developed, manufactured, and marketed by numerous manufacturers.

As shown in FIG. 16, a PDP comprises a front plate 1 and a back plate 2 consisting of a glass substrate 3 and provided on front plate 1 are sustain electrodes 5, a dielectric layer 6 and a protection layer 7. Back plate 2 consists of a second glass substrate 4 and provided on it are address electrodes 8, and barrier ribs 9. Further, phosphor 10 is provided within the ribs 9. Both plates are bonded together along their entire periphery with bonding material 13.

An ordinary manufacturing process of the PDPs can be broken down into the steps of (a) producing front plates, (b) producing back plates, (c) assembling, sealing, vacuuming and gas charging.

When producing a front plate 1, sustain electrodes 5 are formed on a glass substrate 3, and a dielectric layer 6 made of low temperature-melting glass containing lead oxide is formed on glass substrate 3 by screen-printing and sintering.

A back plate 2 is produced by forming address electrodes 8 on a glass substrate 4, and ribs 9 between the address electrodes 8 with low temperature-melting glass containing lead oxide. Phosphors 10 of red, green and blue colors are formed between the ribs 9.

The front plate 1 and the back plate 2 are assembled together by placing one over the other, and hermetically bonding them with bonding material 13 containing lead oxide. A PDP is finally completed by charging it with a rare gas containing Xe, after a sufficient discharge of impure gases by vacuum-pumping an interior, while heating the assembled PDP.

As described, the PDPs use a considerable amount of low temperature-melting glass containing lead oxide. Low temperature-melting glass is used for the dielectric layer in the front plate, the ribs in the back plate, and the bonding material for hermetically bonding the front plate with the back plate, to name a few examples. These PDPs are disposed of, if any flaw is detected in them during the manufacturing process, or when they have lost their usable life in their end use application. However, they cannot be discarded like ordinary waste products, but they are required to be treated properly by establishments specializing in industrial waste disposal, because they contain lead.

Although there is a way to recycle the discarded PDPs as glass cullet for manufacturing glass, the discarded PDPs propound a problem of degrading quality of glass, if mixed with raw glass material, since they contain lead oxide.

Additionally, there is a need for taking urgent measures against disposal of products containing lead components, in view of the recent global environmental issues and strict regulations against lead waste.

SUMMARY OF THE INVENTION

The present invention utilizes a thermal action and a chemical action in a process of disassembling the above-described PDPs.

A first method adopts a component, that does not contract thermally at a softening temperature of a bonding material used for hermetically bonding a front plate to a back plate, and is positioned between the two plates at the front and back. And, the two plates are separated with the use of this component. Further, the above-cited component maintains a gap with either one of the front plate and the back plate under an ambient room temperature, but the component either remains unchanged dimensionally, or expands when heated, thereby the component facilitates disassembly of the PDP.

Furthermore, the present invention provides a groove on at least one of the surfaces of the front plate and the back plate, for communicating the bonding material to an exterior of the PDP. A softened bonding material can be drawn out or absorbed through the groove. Another feature of the invention is to uniformly heat and cool the PDP with a laminated graphite sheet provided on either an upper surface or a side surface of the PDP during the heating process.

A second method of the present invention is to separate a PDP into two glass substrates by immersing the PDP in etching solution that selectively dissolves only lead glass, and melts the bonding material.

For this method, a groove is formed in a space between a perimeter of an image display screen and a bonded portion, in order to prevent the etching solution from invading into the display area in a center of the PDP by a capillary phenomenon. In either case of the front plate and the back plate, the groove is formed in a direction parallel with a longitudinal direction of electrodes formed on the substrates.

The front plate and the back plate which are separated through the foregoing process are refurbished in a way that a deteriorated portion or a defective portion regains an original function. The refurbished front plate and back plate can be reutilized to make a PDP by hermetically bonding them again. Therefore, the handling and disposal of dangerous lead materials may be significantly reduced thereby materially enhancing the quality of the environment.

DESCRIPTION OF THE PREFERRED EMBODIMENTS

Figure 1:
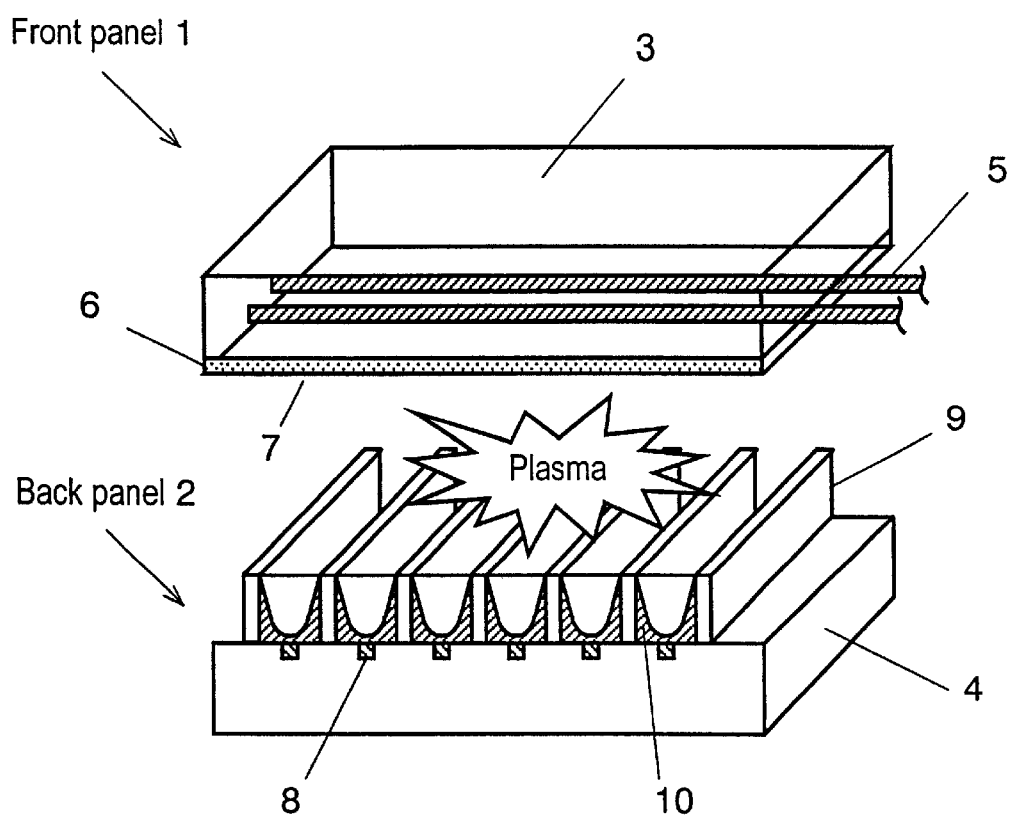
FIG. 1 is an exploded perspective view of a PDP.

Exemplary embodiments of the present invention will be described hereinafter. FIG. 1 shows an exploded perspective view of a surface-discharge type AC PDP. The PDP comprises a front plate 1 and a back plate 2. The front plate 1 comprises sustain electrodes 5 for sustaining an electric discharge, a dielectric layer 6 provided over the sustain electrodes 5 and composed of low temperature-melting glass containing lead oxide, and a protection layer 7 composed of MgO, all formed on a glass substrate 3. The protection layer 7 of MgO has a function of protecting the dielectric layer 6 from sputtering due to electric discharge as well as a function of lowering a discharge voltage.

The back plate 2 comprises address electrodes 8, ribs 9, and phosphors 10 of red, green and blue colors, all formed on another glass substrate 4. Material comprising the ribs 9 is low temperature-melting glass containing filler for maintaining its shape, and lead oxide. Both plates are held together and bonded along their entire periphery with bonding material 13, in an actual PDP, although FIG. 1 illustrates the front plate 1 and the back plate 2 as being separated from each other in order to easily understand them. The bonding material 13 also consists of low temperature-melting glass containing lead oxide. The PDP is completed when it is charged with rare gas such as Ne gas containing several percent of Xe, after having hermetically bonded the front and back plates together with the bonding material 13, while expelling impure gases by vacuum-pumping an interior and heating.

Exemplary embodiments of the present invention will be described hereinafter by referring to FIG. 1 through FIG. 15.

FIRST EXEMPLARY EMBODIMENT

Figure 2:
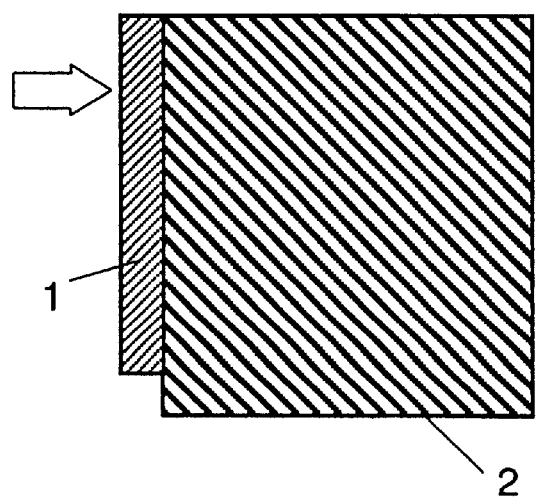
FIG. 2 illustrates a plan view of a PDP and a direction of an applying pressure to the same.

Generally, a PDP has a portion where a front plate 1 and a back plate 2 do not overlap completely, as shown in FIG. 2. This portion is mainly used for leading terminals of address electrodes (not shown in the FIG. 2).

Figure 3:
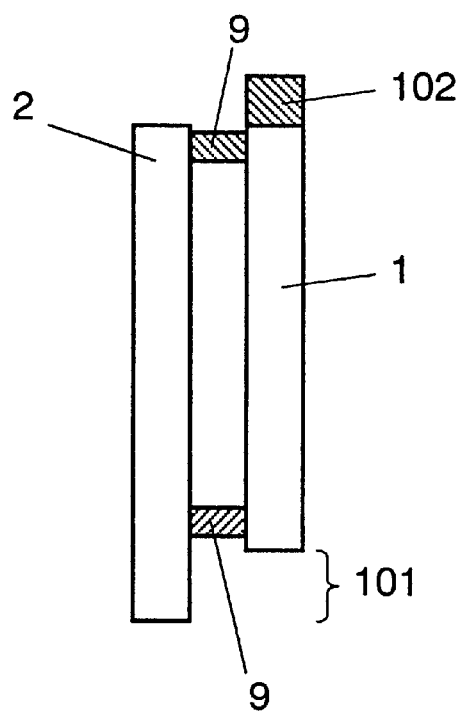
FIG. 3 illustrates a side view of a PDP and a method of applying a pressure to the same.

Thus the PDP can be illustrated as in a side view of FIG. 3, if it is held vertically and viewed from a direction of an arrow shown in FIG. 2. There is a space 101 underneath the front plate 1, as viewed in this direction.

Therefore, the front plate 1 and the back plate 2 can be separated when a downward force is applied to the front plate 1 with a depressing part 102 provided on top of the front plate 1, as shown in FIG. 3, since bonding material 13 softens if the PDP is heated to 450° C. or higher temperature, and more preferably at a temperature between 450° C. and 550° C.

Although the depressing part 102 is provided on the front plate 1 in the present exemplary embodiment, the same result can be attained by providing it on the back plate 2. Also, in the case that the front plate 1 and the back plate 2 overlap entirely, a provision of a spacer stand under one of the panels can produce a space under the other panel, thereby the same result can be attained.

Furthermore, although the depressing part 102 is used for applying a downward force, in the described exemplary embodiment, the same result can be attained by other means such as pulling up one of the plates. Moreover, although the PDP is placed vertically in the described embodiment, the same result can also be attained by placing the PDP horizontally, and either pushing or pulling one side of at least either one of the front plate 1 and the back plate 2 horizontally.

SECOND EXEMPLARY EMBODIMENT

Figure 4:
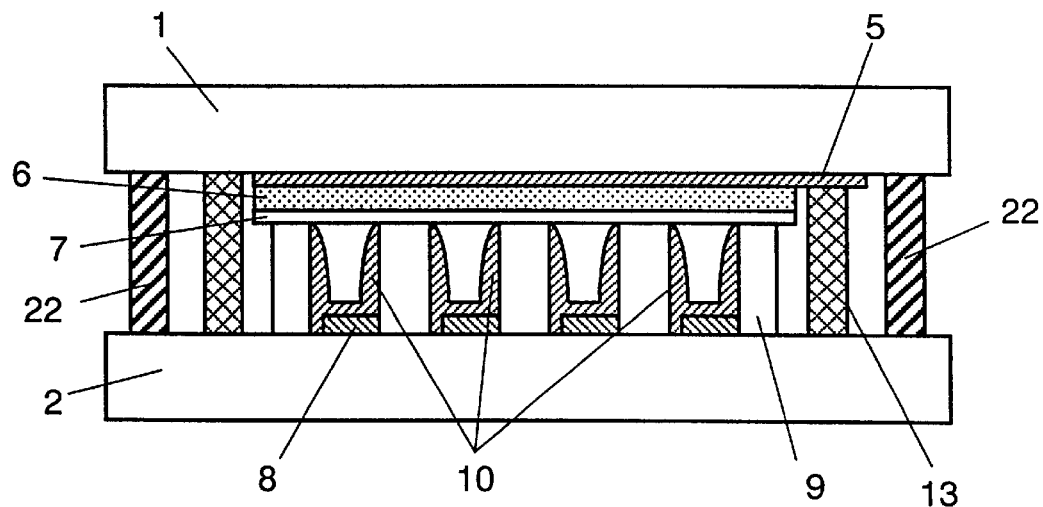
FIG. 4 is a cross-sectional view illustrating a PDP of the present invention.

FIG. 4 is a cross-sectional view illustrating an essential portion of a PDP of the present exemplary embodiment. The PDP has a structure in which a front plate 1 and a back plate 2 are bonded together with bonding material 13. The bonding material 13 in this instance is composed of lead oxide and silicon oxide as primary components. The front plate 1 has a structure wherein sustain electrodes 5, dielectric layer 6 and protection layer 7 are provided on a glass substrate. The back plate 2 has a structure wherein address electrodes 8 and barrier walls 9 are provided on another panel. Also, phosphors 10 are provided within spaces provided between the ribs 9. The bonding material 13 bonds both plates along an entire perimeter of the PDP.

This causes the interior of the PDP to be hermetically sealed. The PDP is also provided with supporting components 22 between the front plate 1 and the back plate 2. The supporting components 22 in this exemplary embodiment are made of stainless steel, which generally has a thermal coefficient of expansion between 1 and $2 \times 10^{-5}$/K. The PDP is placed in a high temperature ambient of 450° C. or higher, and more preferably in a temperature range of 450° C. and 550° C. The supporting components 22 expand thermally in this ambient, so as to widen a space between the front plate 1 and the back plate 2.

On the other hand, the bonding material 13 softens in this high temperature ambient, and it dissociates from the plates, when it becomes unbearable to an expanding force of the supporting components 22. As a result, the PDP can be separated into the front plate 1 and the back plate 2 for reutilization.

Figure 5:
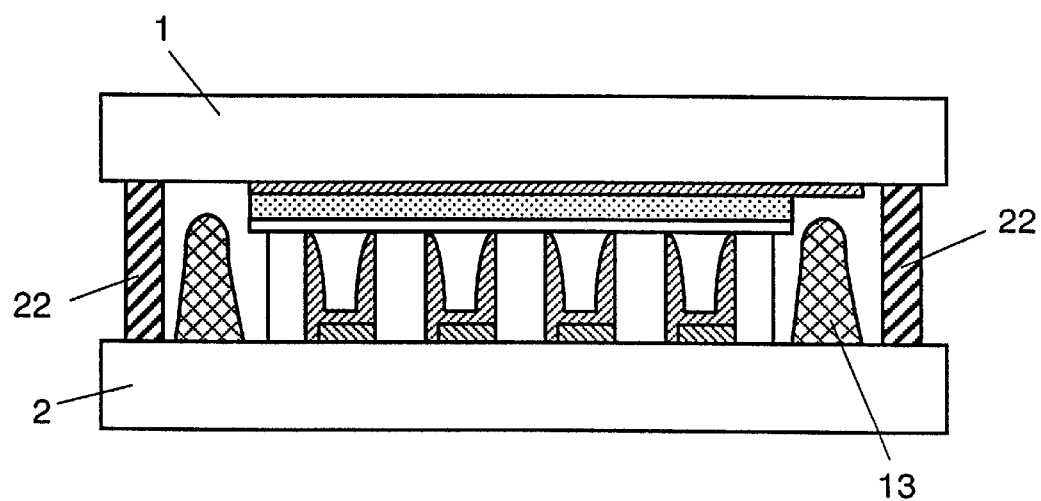
FIG. 5 is a cross-sectional view of the same PDP of the present invention illustrating a state wherein it has been placed in a high temperature ambient.

In the present exemplary embodiment, although the supporting components 22 are provided at an outer side of the bonding material 13, as shown in FIG. 4, the same effect can be attained so long as they are provided at any position between the front plate 1 and the back plate 2. Also, the present exemplary embodiment adopts the supporting components 22 made of stainless steel. The bonding material 13 not only softens, but also flags in this high temperature ambient, so as to shrink in height as shown in FIG. 5. Therefore, the same result can be achieved, even if the supporting components 22 are made of material having a small thermal coefficient of expansion, e.g. ceramic such as silicon nitride, and the like, instead of stainless steel.

Furthermore, although the present exemplary embodiment adopts a structure wherein the supporting components 22 are provided in advance between the front plate 1 and the back plate 2, they may be inserted between the front plate 1 and the back plate 2 immediately before heating the PDP for the purpose of separating the PDP in order to obtain the same effect.

THIRD EXEMPLARY EMBODIMENT

Figure 6:
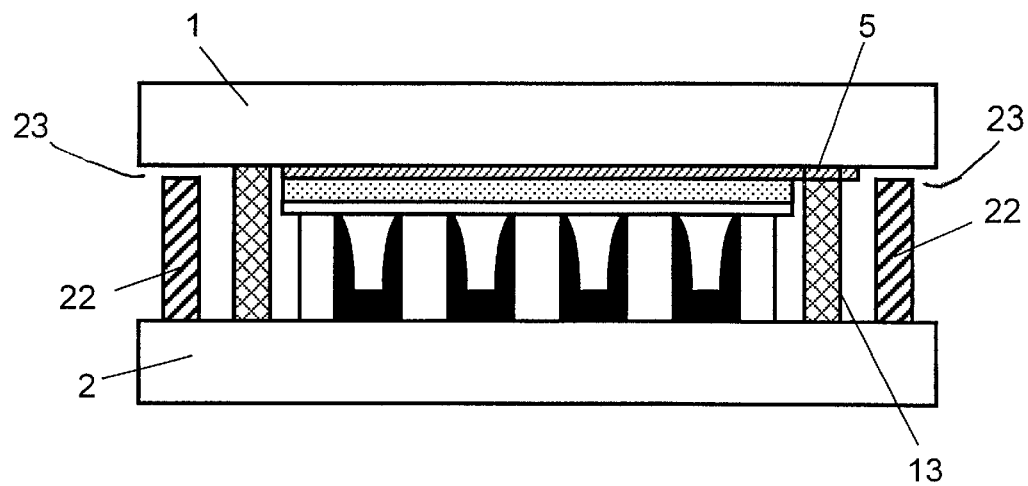
FIG. 6 is a cross-sectional view illustrating a PDP of the present invention.

FIG. 6 is a cross-sectional view showing an essential portion of a PDP of a third exemplary embodiment. In this exemplary embodiment, each of supporting components 22 has a gap 23 between it and front plate 1, whereas it maintains direct contact with back plate 2. The supporting components 22 are made of stainless steel.

The gaps 23 disappear due to a thermal expansion of the supporting components 22, when the PDP is heated to 450° C., which is a softening point of bonding material 13. Further continuation of the heating causes the supporting components 22 to produce a force of expansion, and the bonding material 13 dissociates from the plates when the adhesive properties of bonding material 13 becomes unbearable against this force.

Additionally, supporting components 22 are capable of separating the two plates even if they produce only a small force of expansion, since the bonding material 13 shrinks in height as it flags, as shown in FIG. 5.

FOURTH EXEMPLARY EMBODIMENT

Figure 7:
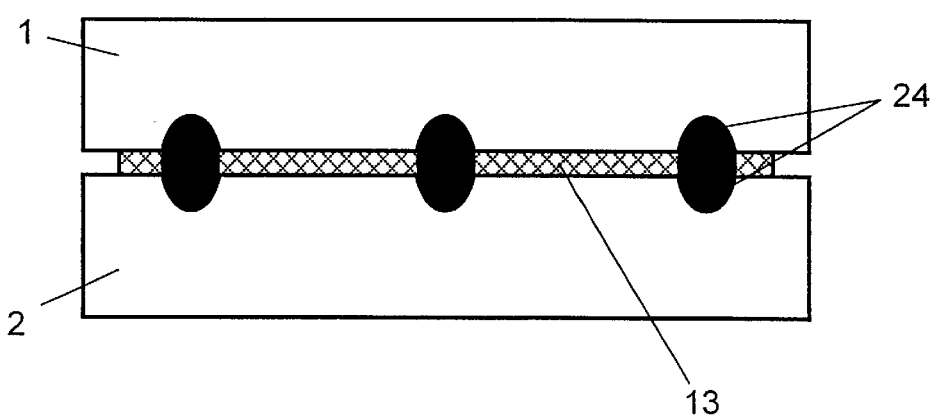
FIG. 7 is a side view illustrating a PDP of the present invention.

FIG. 7 illustrates a side view of a PDP. A back plate 2 is provided with grooves 24 communicating bonding material 13 to an exterior of the PDP. The PDP is heated to a temperature of 450° C. or higher, and more preferably at a temperature range of 450° C. and 550° C. The PDP is then placed in an atmosphere of reduced pressure while maintaining the heated temperature. This method draws out the bonding material 13 through the grooves 24, since the bonding material 13 has been softened at the heated temperature, and the exterior of the PDP is surrounded by the reduced pressure.

Accordingly, the PDP can be separated into the front plate 1 and the back plate 2 for reutilization. In this exemplary embodiment, although the bonding material 13 is removed by reducing a surrounding pressure of the PDP, the same effect can be achieved with an aid of a nozzle-shaped tool for drawing the bonding material 13 by suction. The same effect can also be attained by inserting a metal mesh or a porous material such as alumina-ceramic into the grooves 24, so as to remove the bonding material 13 by absorption or capillary action.

FIFTH EXEMPLARY EMBODIMENT

Figure 8:
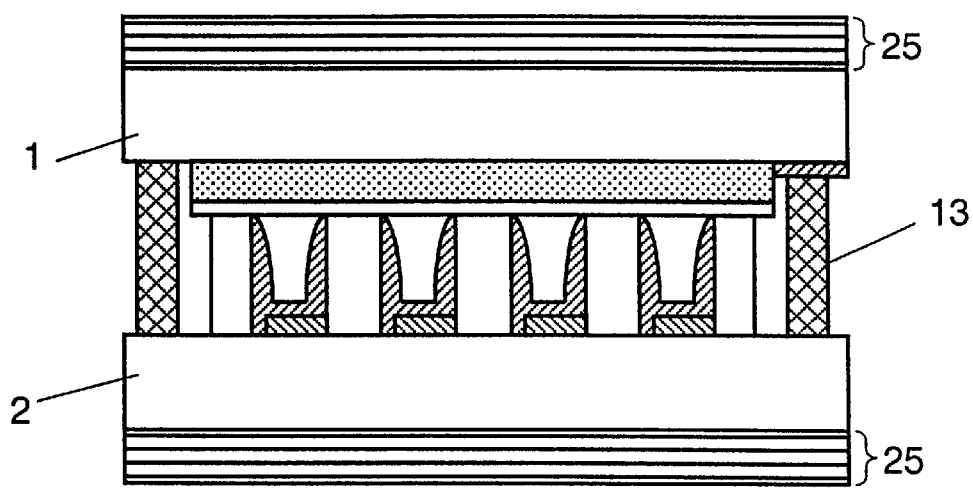
FIG. 8 is a cross-sectional view illustrating a PDP provided with laminated graphite sheets on its surfaces, in a method of separating the PDP of the present invention.
Figure 9:
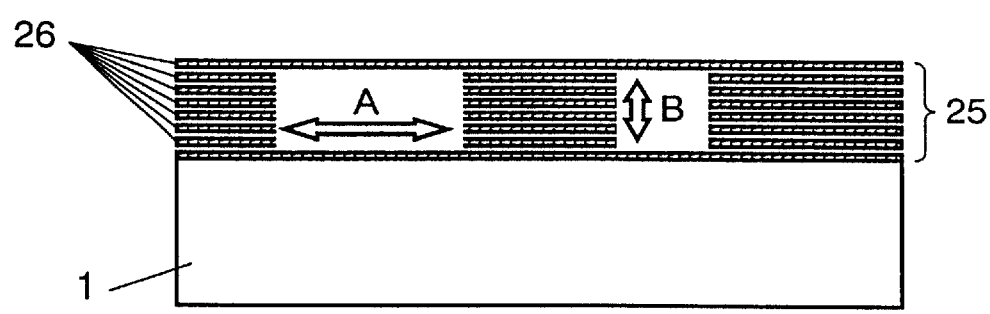
FIG. 9 is a cross-sectional view of the same PDP illustrating a direction of lamination of the laminated graphite sheet in a step of heating the PDP of the present invention.

Laminated graphite sheets 25 are placed on a front plate 1 and a back plate 2, as shown in FIG. 8. The laminated graphite sheets 25 used in this exemplary embodiment comprise a number of discrete graphite sheets 26, which are stacked vertically in the same direction with the front plate 1 and the back plate 2, as shown in FIG. 9 (the back plate 2 is not shown in FIG. 9). The laminated graphite sheets 25 exhibit a relatively high thermal conductivity in a range of 10 to 87 W/m·K in an "A" direction, which is orthogonal to the direction of stacking, but a relatively low thermal conductivity in a range of 0.4 to 1.2 W/m·K in a "B" direction, which is the same direction as the stacking.

Accordingly, a distribution of temperature can be maintained uniformly throughout surfaces of the front plate 1 and the back plate 2 situated under the laminated graphite sheets 25 shown in FIG. 8. As a result, the laminated graphite sheets 25 can prevent the plates and associated components from cracks or similar damages, which may occur otherwise when heating the PDP. Such cracks and damages can occur due to a lack of uniformity in temperature or a thermal shock in the substrates.

SIXTH EXEMPLARY EMBODIMENT

Figure 10:
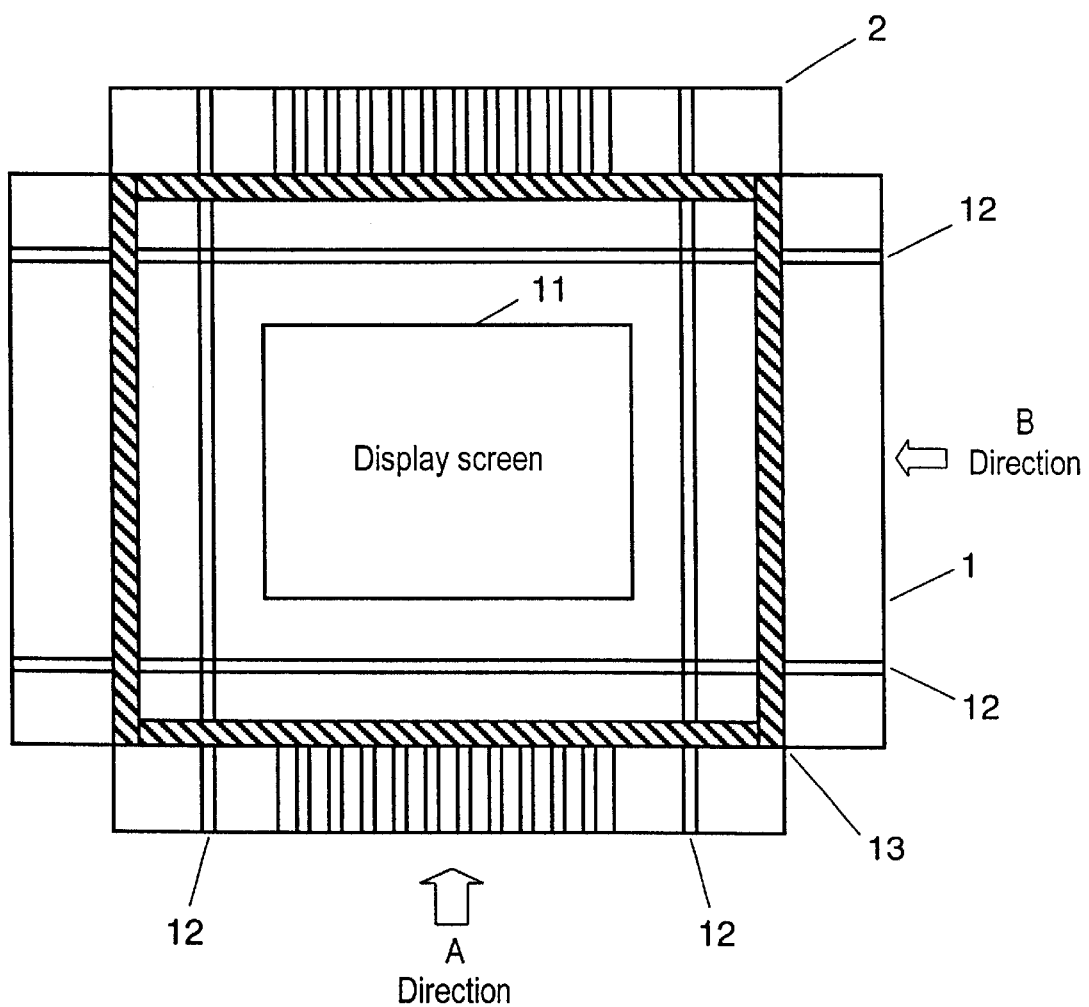
FIG. 10 is a plan view illustrating a PDP of the present invention.

A PDP of the present exemplary embodiment is provided with a groove 12 between a perimeter of an image display screen 11 and a bonded portion on at least either surface of a front plate 1 and a back plate 2, as shown in FIG. 10. This structure prevents etching solution from entering into the screen area by a capillary phenomenon.

In FIG. 10, the image display screen 11 is located in a center area where the front plate 1 and the back plate 2 intersect, and bonding material 13 is applied in a boundary of intersection of the two panels. The groove 12 provided in the area between the bonded portion and the display screen, as shown in FIG. 10, can prevent the etching solution from advancing beyond the groove 12 to the screen side, even if the etching solution permeates through the bonding material 13, thereby protecting the display screen.

The direction of the groove is parallel with a longitudinal direction of electrodes on the front plate 1, on which at least the electrodes and a dielectric layer are formed. Providing the groove 12 in such direction can facilitate lead-out or connection of the sustain electrodes to external terminals, since the electrodes and the groove 12 do not cross with each other. Also, the direction of the groove 12, when provided on the back plate 2, is parallel with a longitudinal direction of electrodes on the back plate 2. Providing the groove in such direction also facilitate lead-out or connection of the address electrodes to external terminals, since the electrodes and the groove 12 do not cross with each other.

The dimensions of the groove 12 in the present invention is described now. In principle, the groove is more effective in preventing permeation of the solution by the capillary phenomenon, as the groove is made wider and deeper. If the groove is sized 1 mm in width and 0.5 mm in depth, for instance, it cannot prevent permeation of the etching solution into the PDP, as the solution crosses over the groove.

However, the groove can prevent permeation, if it is deepened to 1 mm while keeping the same width of 1 mm. Besides, an addition of surface-active agent into the etching solution can effectively reduce a rise of liquid level of the etching solution due to the capillary phenomenon. In the case of a groove in a size of 1 mm in width and 0.5 mm in depth, for instance, the groove can prevent permeation, if a surface-active agent is added into the etching solution, whereas the solution crosses over the groove if it does not contain surface-active agent.

A method of manufacturing a PDP will be described next.

Figure 13:
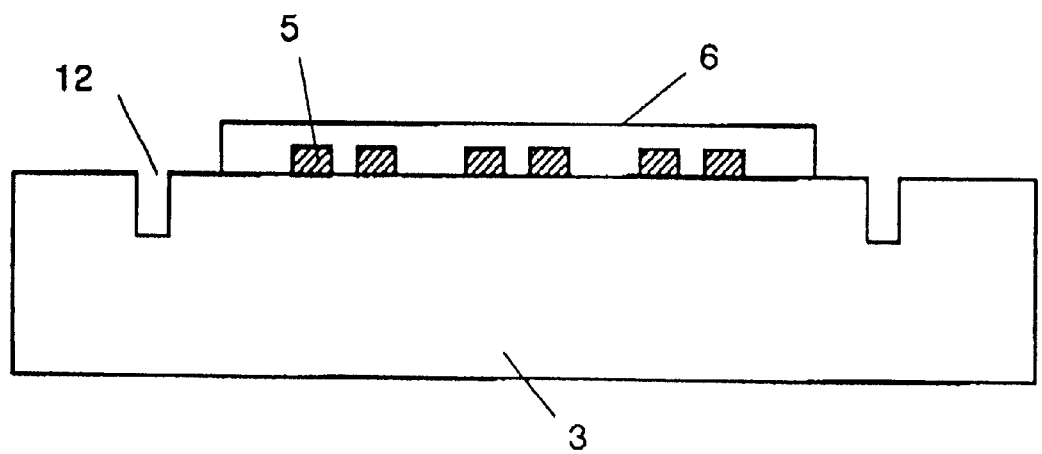
FIG. 13 is a cross-sectional view illustrating a front plate of a PDP of the present invention.

Description of the front plate 1 is addressed. FIG. 13 illustrates a cross-sectional view of the front plate 1. A pane of ordinary soda lime glass having a thickness of 2.8 mm is used for a glass substrate 3, on which a groove 12 of 1 mm wide by 1.5 mm deep is cut at each side with a diamond cutter. The grooves may be made by other methods such as glass etching.

The grooves are to be oriented in parallel with a longitudinal direction of sustain electrodes 5. The sustain electrodes 5 are then formed in a shape of stripes with Ag or Cr/Cu/Cr on the glass substrate 3, after processing the grooves as above. A dielectric layer 6 is formed next by printing low temperature-melting glass containing lead oxide over the sustain electrodes 5.

Figure 14:
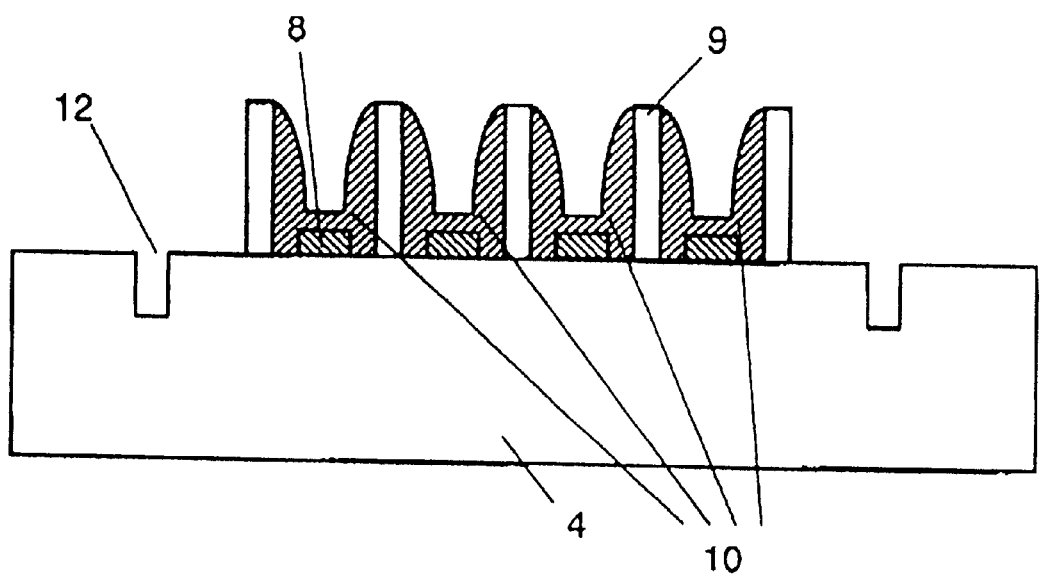
FIG. 14 is a cross-sectional view illustrating a back plate of the PDP of the present invention.

A method of making a back plate 2 is described next. FIG. 14 illustrates a cross-sectional view of the back plate 2. A pane of soda glass having the same thickness of 2.8 mm is used for a glass substrate 4, on which a groove 14 of 1 mm wide by 1.5 mm deep is cut at each side with a diamond cutter.

The grooves are also oriented in parallel with a longitudinal direction of address electrodes 8. The address electrodes 8 are then formed in a shape of stripes with Ag or Cr/Cu/Cr on the glass substrate 4, after processing the grooves as above. Ribs 9 are formed thereafter between the address electrodes 8. The ribs 9 are formed by printing multiple layers of low temperature-melting glass paste containing lead oxide by a screen-printing method. Other methods may be used such as sandblasting, photosensitive paste, photo burying, compression molding, and the like to form ribs 9. Phosphor 10 is then formed by screen-printing phosphor paste between the ribs 9 on the substrate prepared as above.

Figure 11:
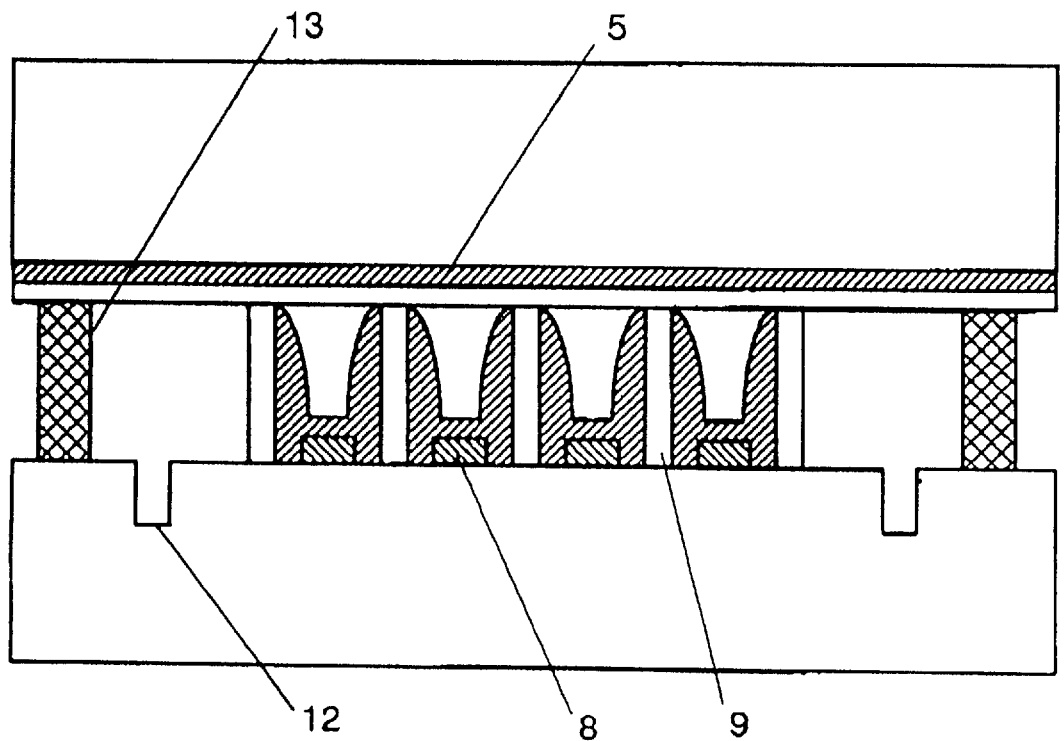
FIG. 11 is a cross-sectional view of the same PDP of the present invention, illustrating an arrangement of grooves.
Figure 12:
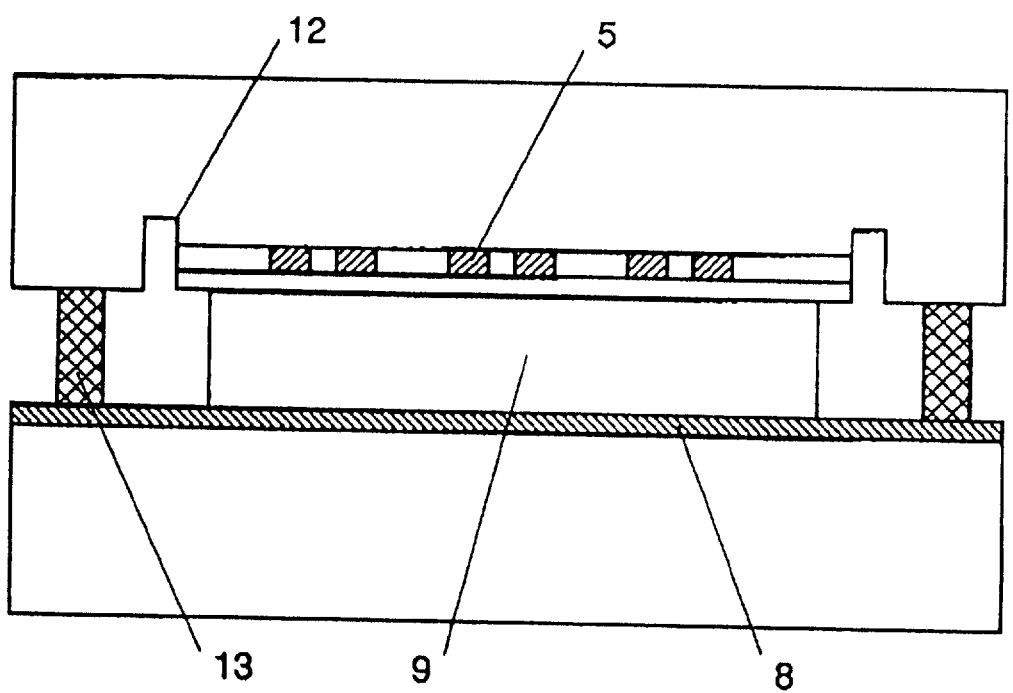
FIG. 12 is another cross-sectional view of the same PDP of the present invention, illustrating an arrangement of grooves.

General outlines of the grooves produced in the above steps are shown in FIG. 11 and FIG. 12. FIG. 11 and FIG. 12 respectively illustrate cross-sectional views of the PDP as it is viewed from an "A" direction and a "B" direction as marked in FIG. 10.

A sealing method will be described hereinafter. The front plate 1 and the back plate 2 are placed together, and sintered to bond them hermetically, afterward they are coated with bonding material 13 (glass paste) near a boundary area of intersection between the two plates, as shown in FIG. 10. The hermetically bonded plates are vacuum-pumped to evacuate air sufficiently from the interior while heating them in an electric furnace, and a mixture of Ne gas containing 5 vol % of Xe is charged at a pressure of 500 torr (ca 67,000 Pa), in order to complete a PDP.

Figure 15:
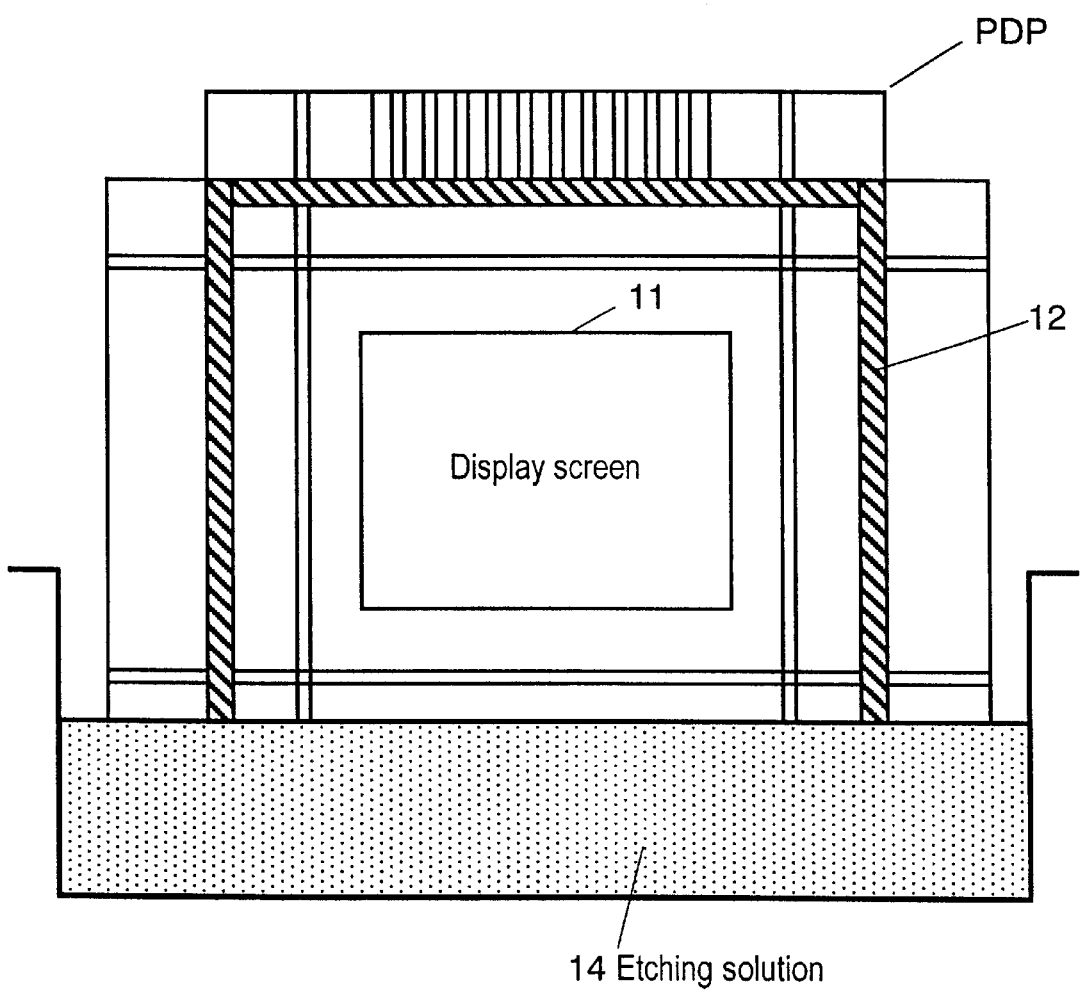
FIG. 15 is a general view illustrating a method of etching a bonded portion of a PDP.
Figure 16:
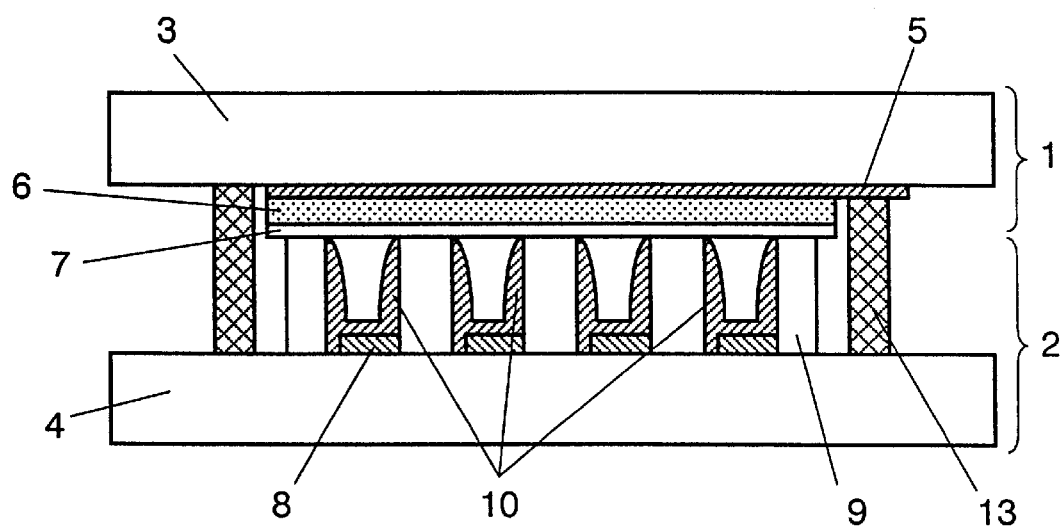
FIG. 16 is a cross-sectional view illustrating a PDP of the prior art.

Described next is a method of recycling a PDP. First, the PDP alone is removed from an apparatus by disconnecting it from a circuit board. A tube (not shown in the figures) used for vacuuming in the foregoing step is pierced to bring the interior back to the atmospheric pressure. FIG. 15 shows a general idea of immersing the PDP in etching solution 14 that can selectively dissolve only lead glass. As shown in FIG. 15, the PDP is immersed in the etching solution 14 to the extent that a liquid level does not exceed beyond the groove 12, while keeping the PDP in a position that the groove 12 on the substrate is parallel with the liquid surface. When the bonding material on one side of the PDP is dissolved, the panel is rotated 90 degrees to continue etching of the remaining sides in the same manner.

One example of the etching solution is an aqueous solution of nitric acid and $HBF_4$. An aqueous solution of mineral acid is another kind, such as sulfuric acid, hydrochloric acid, and the like may be used as an alternative etching solution. Or, other chemical substances may be used as long as they dissolve lead oxide, while not dissolving the substrates made of soda lime glass. The front plate and the back plate are thus separated after all four sides are etched in the described manner.

A method of refurbishing the separated front plate and back plate for restoring the original performance by way of removing a deteriorated portion will be described now. A description pertaining to the front plate is given first. Of all the parts comprising the front plate 1, protection layer 7 is the one that deteriorates the most during ordinary operation of the PDP. In a word, the protection layer 7 is sputtered during long usage periods, even though it is made of MgO, which is highly resistive to sputtering. This results in an exposure of an under layer of dielectric substances, thereby increasing a discharge voltage. Although the layer of MgO reduces the discharge voltage because of its high emissivity of secondary electrons, the dielectric substances have a relatively lower emissivity of secondary electrons as compared to MgO, so as to require a high discharge voltage.

It is therefore necessary to remove the protection layer 7 from the separated front plate and to reform a new protection layer 7 with MgO, in order to restore the performance. Dry etching such as chemical etching with hydrochloric acid, sputter etching, and the like are some of the methods available for removing the protection layer 7. Electron beam deposition, reactive sputtering, CVD method, screen-printing, and the like are used to form a new protection layer of MgO in a thickness of 0.5 $\mu$m to 1 $\mu$m.

A method of refurbishing the back plate is now described. A phosphor 10 is the one that deteriorates mainly in the back plate 2 during use of the PDP. In a word, charged particles generated by plasma discharge collide against the phosphor 10, and reduce luminous efficiency of the phosphor. Additionally, sputtered MgO deposits on the surface of the phosphor, and reduces transmissivity of the ultraviolet rays, so as to further decrease the luminous efficiency of the phosphor.

In order to restore the original performance, it is necessary to remove the phosphor 10 from the separated back plate, and to reform a new phosphor. Some of the methods available for removing the phosphor include blowing off of the remaining phosphor with pressurized gas, brush-cleansing or ultrasonic cleansing in organic solvent, and the like. A combination of these methods may be used for removing of the phosphor 10. A new phosphor is formed thereafter with such methods as screen-printing, ink-jet printing, and the like.

Using the refurbished front plate and back plate, a PDP is completed by hermetically bonding them again, and charging an interior of the bonded panels with mixture of Ne gas containing 5 vol % of Xe. The PDP as refurbished in the foregoing process is not at all inferior to a new PDP, and it exhibits totally identical performance to the brand-new PDP.

SEVENTH EXEMPLARY EMBODIMENT

Described hereinafter is a seventh exemplary embodiment, herein surface-active agent is added into etching solution for lead oxide-contained glass.

A PDP is immersed in solution, which is prepared by adding 10% of neutral detergent in the etching solution used in the sixth exemplary embodiment. The etching solution added with surface-active agent can reduce a level of permeation that the solution rises up into a space between the two plates from the liquid surface, when compared to the case using the etching solution with no additive.

For this reason, it does not require close watching for a parallelism of the groove 12 with respect to a liquid surface during the immersion. Work efficiency is thus improved. There are cases where etching solution permeates beyond the groove if the groove is not kept almost parallel with the liquid surface, when the surface-active agent is not added.

There is also an effect of allowing a reduction in width and depth of the groove to be formed on the substrates. If the groove is in a size of 1 mm in width and 0.5 mm in depth, for instance, it cannot prevent permeation of the etching solution, as the solution crosses over the groove. However, addition of the surface-active agent prevents the etching solution from permeating into an interior of the PDP.

After separation, the plates are refurbished by implementing the methods as have been described in the sixth exemplary embodiment.

As has been described, the present invention realizes separation of the plates, thereby providing an advantageous effect of reutilizing them, although plates of the prior art PDPs have not been recycled before. The present invention also provides an advantageous effect that the PDP is capable of resisting against heating without resulting in cracks and fracture, even if it is heated rapidly during a process of separation.

Further, the plates can be reutilized for new PDPs by collecting old PDPs from the marketplace after they have lost their original performance over the long term of service. That is, a dielectric layer formed on the front plate and ribs formed on the back plate can be used just as they are. This helps to reduce manufacturing steps in the production of PDPs, as well as reducing the power consumption for manufacturing PDPs and for electric furnaces because of a reduction in number of sintering processes.

The invention reduces waste disposal of the glass substrates, even if they are not reused for new PDPs, since removal of the lead components from the panels allows them to be treated as ordinary glass. There is also an advantage that the panels can be recycled as glass cullet in any glass manufacturing factories, as needless to note. Moreover, nonworking PDPs can be reused for manufacture of glass substrates. Accordingly, effects of the present invention are very environmentally significant, considering that waste disposal of PDPs have a harmful environmental impact. Therefore, PDPs are disposed of as industrial waste.

What is claimed is:

1. A plasma display panel configured for ease of disassembly comprising:
   a display area,
   a front plate and a back plate with ribs disposed inside the display area, the ribs maintaining a space therebetween, and
   a component located between the front and back plates, the component disposed separate from and outside the display area, wherein said component comprises a material selected from the group consisting of a metal material and a non-glass ceramic material expandable to widen the space between said front and back plates upon heating.

2. The plasma display panel according to claim 1, wherein a bonding material connects the front and back plates, and said component maintains the width of the predetermined space between said two plates at a temperature equal to or higher than the softening temperature of said bonding material.

3. The plasma display panel according to claim 1, wherein a bonding material connects the front and back plates, and said component increases the width of the predetermined space between said two plates at a temperature equal to or higher than the softening temperature of said bonding material.

4. A plasma display panel configured for ease of disassembly comprising:
   a display area,
   a front plate and a back plate with ribs disposed inside the display area, the ribs maintaining a space therebetween, and
   a component located between the front and back plates, the component disposed separate from and outside the display area, wherein said component comprises a material selected from the group consisting of a metal material and a non-glass ceramic material expandable to widen the space between said front and back plates upon heating,
   wherein said component is in contact with one said front plate and back plate and maintains a gap with the other of said front plate and said back plate under an ordinary room ambient operating temperature, said component coming into contact with both of said plates when said plasma display panel is heated beyond said operating temperature.

5. A plasma display panel comprising a front plate; a back plate bonded to the front plate at the peripheries of said plates, thereby defining a bonded portion; a display screen located between the two plates within the bonded portion; and a groove in at least one of the front and back plates for communicating between the bonded portion and the periphery of said front and back plates, the groove entirely surrounding the display screen within the bonded portion.

6. A plasma display panel comprising a front plate; a back plate bonded to the front plate at the peripheries of said plates, thereby defining a bonded portion; a display screen located between the two plates within the bonded portion; and a groove in one of a front plate and a back plate thereof, said groove being located away from the bonded portion of said front and back plates and the display screen.

7. The plasma display panel according to claim 6, wherein one of said plates is provided with at least a first electrode and a dielectric layer, and said groove is provided in parallel with a longitudinal direction of said first electrode on said plate.

8. The plasma display panel according to claim 7, wherein one of said plates is provided with at least a second electrode and a rib, and said groove is provided in parallel with a longitudinal direction of said second electrode on said plate.

* * * * *